July 30, 1929.   J. W. ANDERSON   1,722,486
ADVERTISING DEVICE
Filed Oct. 29, 1925
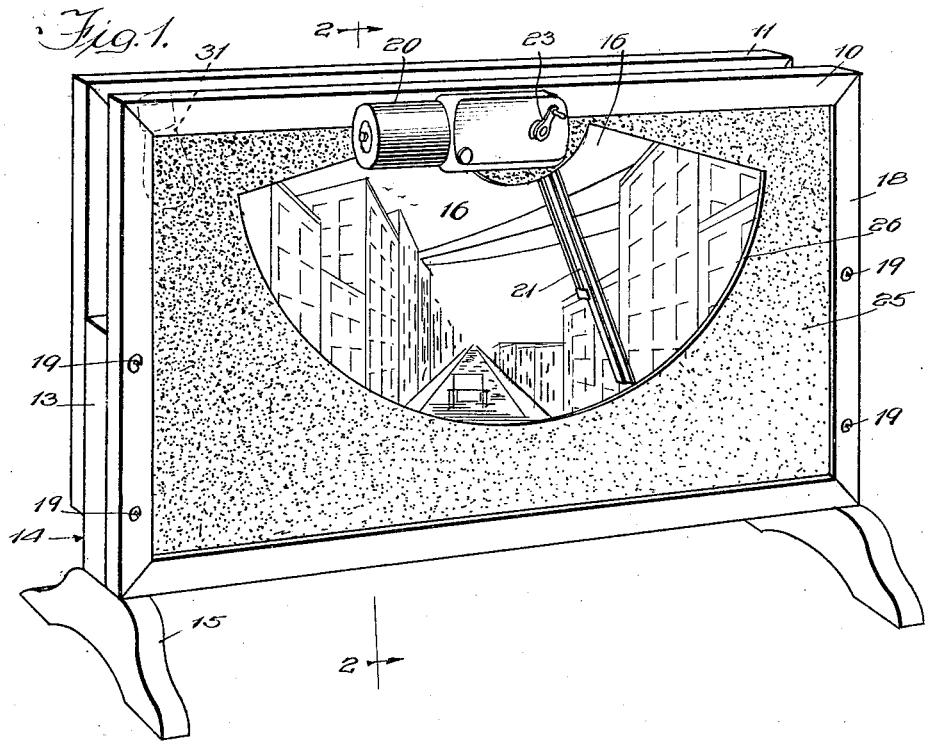
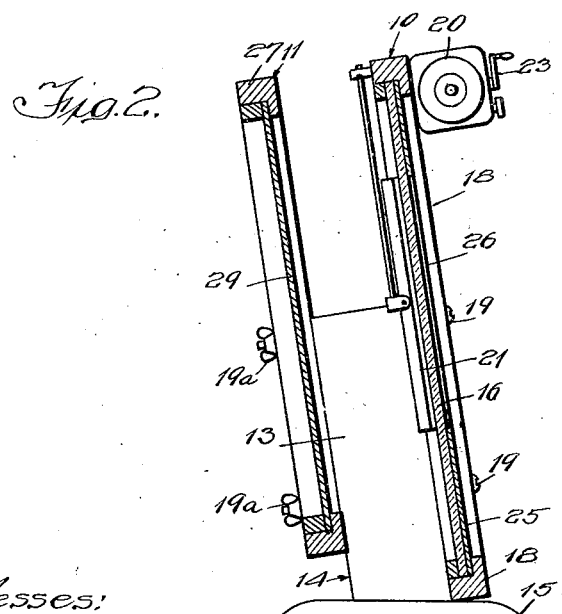

Patented July 30, 1929.

1,722,486

UNITED STATES PATENT OFFICE.

JOHN W. ANDERSON, OF GARY, INDIANA.

ADVERTISING DEVICE.

Application filed October 29, 1925. Serial No. 65,602.

My invention relates to advertising devices and particularly to advertising devices adapted to display the article or articles being advertised.

The invention has among its other objects the production of a device of the kind described which is convenient, compact, durable, neat and attractive in appearance, satisfactory for use wherever found applicable, and may be readily disassembled for shipping and storing purposes.

A particular object of the invention is to produce an improved device of the kind described which will demonstrate the use of the article or articles being advertised.

Another particular object of the invention is to produce an improved device for demonstrating the advantages of employing windshield wipers.

One form of the invention is embodied in a device adapted to display windshield wipers, the device preferably comprising a pair of spaced panels mounted upon standards which permit the device to be placed upon a table, counter or the like. The device may be quickly and easily disassembled for storing and shipping purposes. One of the panels comprises a pane of glass or the equivalent which represents the windshield of an automobile, a windshield wiper being mounted upon the device in such manner that an oscillating squeegee forming part thereof may traverse a portion of the glass. That portion of the glass not engageable by the squeegee is preferably covered with a sheet of paper, or the equivalent, printed or colored to represent snow or sleet, but may be frosted or otherwise prepared to represent matter on the windshield hindering vision therethrough. The other panel is positioned in back of the pane of glass and is visible through that portion of the glass traversed by the squeegee. A suitable scene or picture is preferably printed or painted upon the rear panel to correspond to the representation of sleet or snow or other matter painted or printed upon the front panel, the scene or picture being proportioned to indicate the range of vision through that portion of a windshield traversed by the squeegee. The windshield wiper may be manually operated by an observer or may be connected to any suitable source of energy which will cause the squeegee to function. Obviously, the benefits to be derived from installing a windshield wiper upon the windshield of an automobile will become readily apparent to the observer.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Fig. 1 is a perspective view of an advertising device embodying my invention; and Fig. 2 is a section taken on the line 2—2 of Fig. 1.

In the drawing I have shown the preferred form of the invention embodied in a device adapted to demonstrate windshield wipers. The device preferably comprises spaced panels 10 and 11 mounted upon posts 13 of standards 14 which are also provided with feet 15. This construction permits the device to be positioned upon a table, a counter, or the like, so that it may be properly displayed. As shown in Fig. 2, the panels 10 and 11 are preferably inclined from the vertical in such manner that the panel 11 is readily visible to an observer through a transparent portion of the front panel 10. In other words, the height of the average table or counter is such that if the panels 10 and 11 were not inclined from the vertical, the average observer would have to stoop to view the rear panel 11 through the transparent portion of the front panel 10.

The above-mentioned transparent portion of the panel 10 preferably comprises a pane 16 of glass or the equivalent, which is mounted in a suitable frame 18, also forming part of the panel 10. As shown, the panels 10 and 11 may be secured to posts 13 by screws or bolts 19 and wing nuts 19ª or their equivalents for the purpose. Obviously the device may be quickly and easily assembled or disassembled. This permits it to be packed into a compact package for shipment or storage.

Suitably mounted upon the frame 18 is a windshield wiper 20 having an oscillating squeegee 21 adapted to traverse a portion of the pane of glass 16. The details of the windshield wiper 20 do not form a part of this invention, but for the purposes of this disclosure, I have illustrated a windshield wiper of the electromagnetically operated type which may also be manually operated by means comprising a crank 23. It will be noted that the windshield wiper 20 comprises a housing positioned upon the front side of the panel 10 and that the squeegee 21 is mounted upon the rear side thereof. This is in accordance with the usual practice wherein the operating mechanisms of windshield wipers are mounted upon the inner sides of windshields and the squeegees thereof are positioned to engage the outer sides of the windshields. In other words, the operating mechanism is generally positioned on the same side of the windshield as the driver of the automobile and the squeegee is positioned on the other side thereof, which side is subject to rain, snow and sleet. That portion of the pane 16 not traversed by the squeegee 21 is preferably rendered opaque, or substantially so. This may be done by frosting the pane 16 or by coloring it in any suitable manner. In the drawing I have shown the pane 16 covered by a sheet of paper 25 having an arcuate opening 26 formed therein for leaving uncovered that portion of the pane 16 traversed by the squeegee 21. The paper 25 is preferably colored or printed to represent snow or sleet adhering to the pane 16. It will be readily understood that the paper may be printed or painted to represent any desired weather conditions.

The panel 11 is disposed in back of the panel 10 and is spaced therefrom. The panel 11 preferably comprises a frame 27 corresponding to the frame 18 of the panel 10. Secured in the frame 27 is an opaque panel 29 upon which any suitable scene or picture is painted, printed, or lithographed to correspond to the weather conditions indicated upon the paper 25. Obviously, this scene or picture is visible through the uncovered portion of the pane 16 and gives the observer the impression that he is viewing the scene or picture through the windshield of an automobile.

The windshield wiper 20 may be manually operated by the observer, or it may be connected to any suitable source of energy to cause it to operate continuously. If desired, an electric lamp 31 or the equivalent may be mounted intermediate the panels 10 and 11 to illuminate the scene or picture upon the panel. The devices painted or printed upon the panel 11 are preferably so proportioned that they indicate the range of vision through that portion of a windshield traversed by the squeegee.

The device gives substantially the same impression as one would get sitting in an automobile and looking down a street or road through the area on the windshield kept clean by the squeegee.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A device of the kind described comprising a panel having a transparent portion and having a portion indicating certain weather conditions, a second panel disposed in back of the first-mentioned panel and having a scene thereon indicating weather conditions corresponding to the first-mentioned weather conditions.

2. A device of the kind described comprising a panel having a transparent portion corresponding to the portion of a windshield traversed by the squeegee of a windshield wiper, and a second panel disposed in back of the first-mentioned panel and having a scene thereon indicating the range of vision through said portion of a windshield.

3. A device of the kind described comprising a panel having a transparent portion corresponding to the portion of a windshield traversed by the squeegee of a windshield wiper, and a second panel disposed in back of the first-mentioned panel and having a scene thereon visible through said transparent portion.

4. A device of the kind described comprising means for mounting a windshield wiper having a squeegee, and means for indicating the range of vision through that portion of a windshield traversed by the squeegee when the wiper is in operation.

5. An advertising device of the kind described comprising a panel adapted to support a windshield wiper having a squeegee, said panel having a permanently and substantially opaque portion which borders the path of the squeegee to illustrate the manner in which it is adapted to clean a windshield.

6. An advertising device of the kind described comprising a panel adapted to support a manually operable windshield wiper having a squeegee, said panel being permanently and substantially opaque but for a portion which may be traversed by the squeegee to illustrate the manner in which it is adapted to clean a windshield.

7. A device of the kind described comprising a panel adapted to support a windshield wiper having a squeegee, said panel having a portion thereof rendered permanently and substantially opaque to represent certain weather conditions.

8. A device of the kind described comprising a panel adapted to support a windshield wiper having a squeegee arranged to traverse a portion of the panel, and a second panel having a scene thereon visible through said portion.

9. A portable device of the kind described comprising a panel having a substantially opaque portion and a transparent portion, a second panel visible through said transparent portion and having a scene thereon to indicate the range of vision through said transparent portion, and means fixed with respect to said panels for illuminating said second panel.

10. A portable advertising device of the kind described comprising a plurality of standards, a plurality of panels detachably secured to said standards, a device to be advertised secured to one of said panels, and means on the other of said panels to assist in illustrating the function of said device, said panels being arranged one in front of the other.

In testimony whereof, I have hereunto signed my name.

JOHN W. ANDERSON.